(12) United States Patent
Desabhatla et al.

(10) Patent No.: US 10,084,409 B2
(45) Date of Patent: Sep. 25, 2018

(54) MAIN FIELD VOLTAGE LIMITER IN BRUSHLESS SYNCHRONOUS MACHINES

(71) Applicant: General Electric Company, Schenectady, NY (US)

(72) Inventors: Sreedhar Desabhatla, Bavaria (DE); Shashidhar Nibhanupudi, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 547 days.

(21) Appl. No.: 14/288,016

(22) Filed: May 27, 2014

(65) Prior Publication Data

US 2015/0349696 A1  Dec. 3, 2015

(51) Int. Cl.
| | |
|---|---|
| *H02K 19/02* | (2006.01) |
| *H02P 31/00* | (2006.01) |
| *H02P 9/14* | (2006.01) |
| *H02P 9/30* | (2006.01) |
| *H02P 25/03* | (2016.01) |

(52) U.S. Cl.
CPC ............. *H02P 31/00* (2013.01); *H02K 19/02* (2013.01); *H02P 9/14* (2013.01); *H02P 9/302* (2013.01); *H02P 25/03* (2016.02); *H02P 2207/05* (2013.01)

(58) Field of Classification Search
CPC ....................................................... H02P 7/06
USPC ................................................ 318/701, 723
See application file for complete search history.

(56) References Cited

U.S. PATENT DOCUMENTS

| | | | | |
|---|---|---|---|---|
| 4,245,182 | A * | 1/1981 | Aotsu | ............ H02P 9/10 174/DIG. 15 |
| 5,264,778 | A * | 11/1993 | Kimmel | ............ H02H 7/065 174/DIG. 17 |
| 5,532,574 | A | 7/1996 | Wolfe et al. | |
| 8,058,851 | B2 * | 11/2011 | Petkov | ............ H02P 9/102 322/44 |
| 8,536,816 | B2 | 9/2013 | Fish | |
| 2006/0164045 | A1 * | 7/2006 | Gibbs | ............ H02P 9/105 322/19 |

(Continued)

FOREIGN PATENT DOCUMENTS

| | | |
|---|---|---|
| EP | 2 621 044 A2 | 7/2013 |
| WO | 0117084 A1 | 3/2001 |

OTHER PUBLICATIONS

"IEEE Recommended Practice for Excitation System Models for Power System Stability Studies; IEEE Std 421.5-2005 (Revision of IEEE Std 421.5-1992)", IEEE Standard, IEEE, Piscataway, NJ, USA, Jan. 1, 2006 (Jan. 1, 2006), pp. 1-85. XP017603872, ISBN: 978-0-7381-4786-4. * the whole document *.

(Continued)

*Primary Examiner* — Muhammad S Islam
(74) *Attorney, Agent, or Firm* — Fletcher Yoder, P.C.

(57) ABSTRACT

A brushless synchronous machine with a limiter for main field voltage and a method of limiting main field voltage in a brushless synchronous machine are described. The machine includes a regulator to use a field current to excite main field windings and generate the main field voltage. The machine also includes a limiter to limit the field current to maintain the main field voltage corresponding to the field current below a limit based on a transfer function.

14 Claims, 3 Drawing Sheets

(56) References Cited

U.S. PATENT DOCUMENTS

2006/0290292 A1* 12/2006 Li .................. H05B 41/3928
                                                  315/194

OTHER PUBLICATIONS

Zazo A et al: "Identification of excitation systems from time response tests", Control, 1994, Control '94, vol. 1., International Conference on Coventry, UK, London, UK, IEE, UK, Jan. 1, 1994 (Jan. 1, 1994), pp. 839-844, XP006513066, DOI: 10.1049/CP:19940242 ISBN: 978-0-85296-610-5 *the whole document*.
European Search Report—Application No. 15167976.8-1806/2950442 dated May 3, 2016.

* cited by examiner

MAIN FIELD VOLTAGE LIMITER IN BRUSHLESS SYNCHRONOUS MACHINES

BACKGROUND OF THE INVENTION

The subject matter disclosed herein relates to brushless synchronous machines.

In a brushless synchronous machine, such as a synchronous generator, a regulator delivers the field excitation to the rotating field poles. An increase or decrease in the field current to the regulator affects the generator field voltage (main field voltage). The field current that affects the main field voltage is controlled by a feedback loop, but the resulting main field voltage may not be conveniently measurable due to rotation of the field. As a result, a fault in the feedback loop or the system (gird) may cause the field current and, consequently, the main field voltage to exceed rated values.

BRIEF DESCRIPTION OF THE INVENTION

According to one aspect of the invention, a brushless synchronous machine with a limiter for main field voltage includes a regulator configured to use a field current to excite main field windings and generate the main field voltage; and a limiter configured to limit the field current to maintain the main field voltage corresponding to the field current below a limit based on a transfer function.

According to another aspect of the invention, a method of limiting main field voltage in a brushless synchronous machine includes regulating a field current to excite main field windings and generate the main field voltage; and limiting the field current to maintain the main field voltage corresponding to the field current below a limit based on a transfer function.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As noted above, the field current to a regulator affects the main field voltage of a synchronous machine (generator). While the field current is controlled through a feedback loop, a fault in the feedback or the system (grid) cannot be detected at the main field voltage, because the main field voltage is difficult to measure with conventionally available sensors. Embodiments of the systems and method described herein relate to developing a transfer function to estimate main field voltage based on field current. Additional embodiments relate to limiting the main field voltage by limiting the applied field current.

Figure 1:
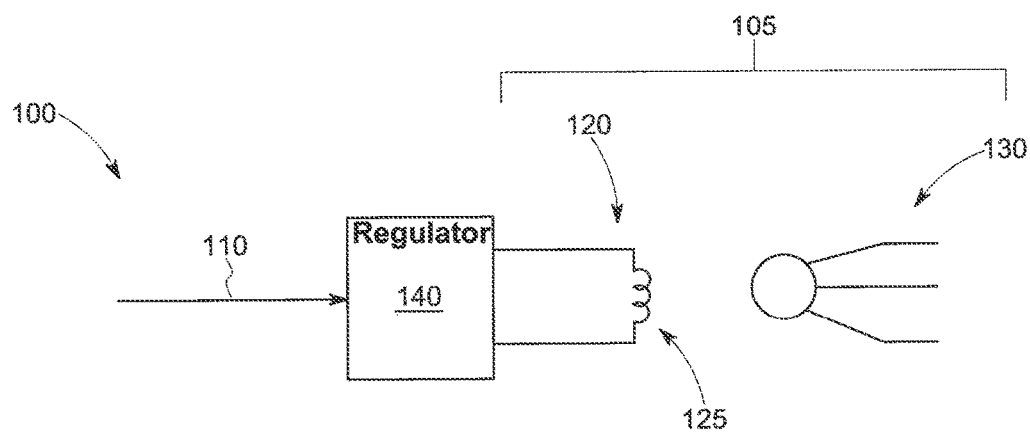
FIG. 1 is a block diagram of an exemplary brushless synchronous machine according to embodiments of the invention.

FIG. 1 is a block diagram of an exemplary brushless synchronous machine according to embodiments of the invention. The exemplary brushless synchronous machine is a generator 100. The generator 100 includes a regulator 140 that supplies the main generator 105. A field current 110 is input to the regulator 140, which may include a winding and a rectifier. The main field voltage 120 is the voltage applied at the main field winding 125 that results in the terminal voltage 130 of the generator 100. Due to rotation of the windings 125, the main field voltage 120 is difficult to measure. This main field voltage 120 is related to the input field current 110 and has a limit, indicated by the manufacturer of the brushless synchronous machine, for proper operation. To ensure that the main field voltage 120 does not exceed a specified maximum value, a transfer function 210 (FIG. 2) is developed to estimate main field voltage 120 based on the applied field current 110. Based on the transfer function 210, the field current 110 is limited to maintain the main field voltage 120 within the operational limit. The specified maximum value may be based on a recommendation of the manufacturer of the brushless synchronous machine. Alternatively, the specified maximum value may be based on customer or region specific limits on the main field voltage, which may be lower than the manufacturer recommended maximum.

Figure 2:
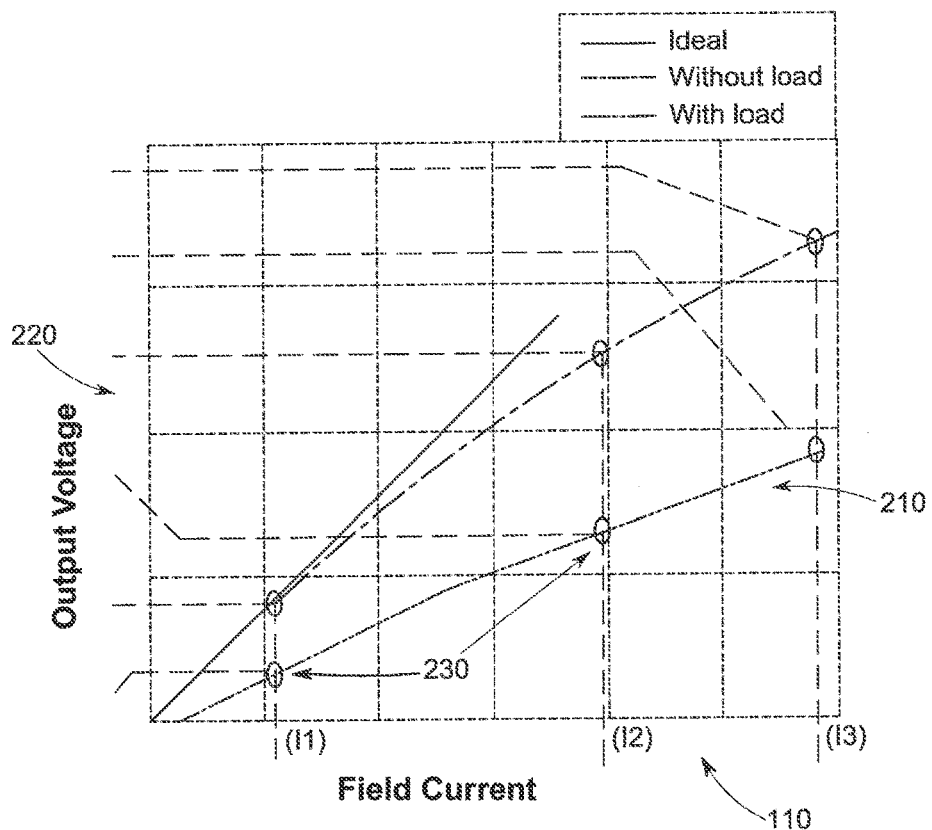
FIG. 2 illustrates the transfer function relating field current to main field voltage in a brushless synchronous machine according to embodiments of the invention.

FIG. 2 illustrates the transfer function 210 relating field current 110 to main field voltage 120 in a brushless synchronous machine according to embodiments of the invention. The field current 110 is shown on the x-axis and the resulting rectified output voltage 220 is shown on the y-axis. That is, the rectified output voltage 220 is the regulator 140 output voltage which is applied as the main field voltage 120. Three different curves are shown. The curve indicating the ideal relationship between field current 110 and main field voltage 120 does not account for saturation. The saturation refers to a limit on the magnetization of the ferromagnetic material (e.g., iron) forming the windings. That is, once the material is saturated, an increase in the applied magnetic field cannot increase the magnetization of the material further (the total magnetic flux density levels off). The curve indicating the relationship between field current 110 and rectified output voltage 220 without load indicates that the main generator 105 is not attached. That is, the load on the regulator 140 that has the input field current 110 (as shown in FIG. 1) is the main generator 105. The curve (transfer function 210) indicating the relationship between field current 110 and rectified output voltage 220 with a load (the main generator 105) indicates the relationship between the field current 110 and the main field voltage 120. The transfer function 210 is developed by applying a known curve-fitting technique to the various data points 230 provided by the manufacturer of the brushless synchronous machine. The data points 230 relate to saturation points, for example.

Figure 3:
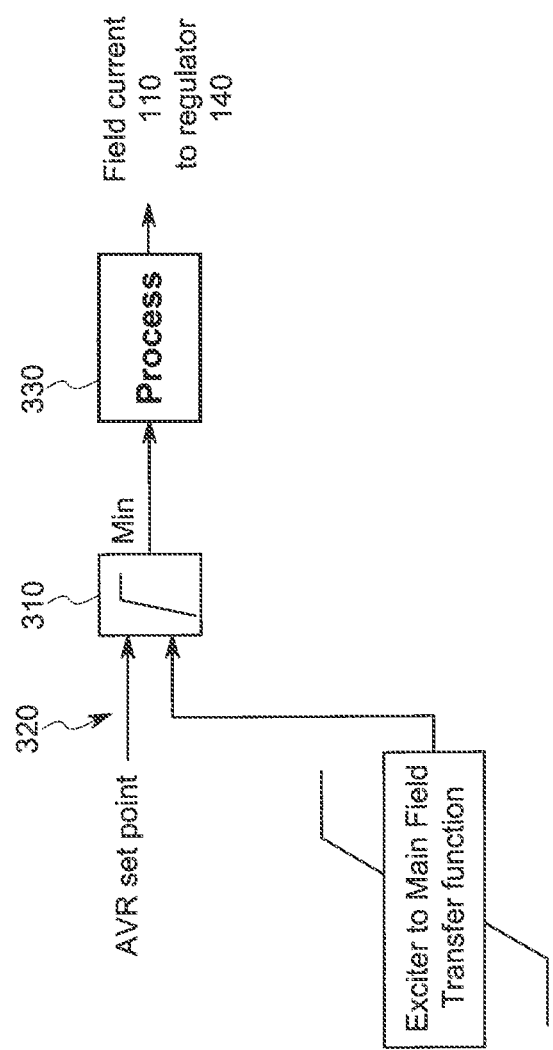
FIG. 3 illustrates a limiter according to an embodiment of the invention facilitated by the transfer function developed according to embodiments of the invention.

FIG. 3 illustrates a limiter 310 according to an embodiment of the invention facilitated by the transfer function 210 developed according to embodiments of the invention. The automatic voltage regulator (AVR) set point 320 is determined according to a known feedback loop using the rated terminal voltage 130. The AVR set point 320 controls the field current 110 that is ultimately output according to a known process 330 shown in FIG. 3. When a fault occurs in the feedback or the system that determines the AVR set point 320, a high field current 110 can be requested as a result. That is, if the measured terminal voltage 130 fed back to determine the AVR set point 320 is lower than the desired terminal voltage 130 due to an error or because of a loss of feedback, for example, the AVR set point 320 (and resulting requested field current 110 value) can continue to increase in successive control loops. As another example, when a problem in the system (the grid) causes terminal voltage 130 to be lower than it should be based on the applied filed current 110, the feedback will cause the AVR set point 320 to be increased to try to affect the desired terminal voltage 130. The field current 110 can ultimately increase, based on the control loop for the AVR set point 320, to a value at which the corresponding main field voltage 120 exceeds the specified limit. As noted above, the specified limit may be based on a recommendation by the manufacturer of the brushless synchronous machine, by the customer, or in accordance with a limit in the region of operation. This can, in turn, negatively affect the operation of the brushless synchronous machine. The limiter 310 acts as a hard limit on the field current 110 resulting from the AVR set point 320. By using the transfer function 210 developed as discussed with reference to FIG. 2, the field current 110 corresponding with the maximum recommended or desired main field voltage 120 is determined. This corresponding field current 110 is used to limit (in the limiter 310) the AVR set point 320. Thus, if the AVR set point 320 keeps increasing, as in the case of the exemplary fault discussed above, that increase will ultimately be limited by the limiter 310, based on the transfer function 210, to ensure that the resulting field current 110 does not reach a level at which the main field voltage 120 exceeds the specified limit.

Figure 4:
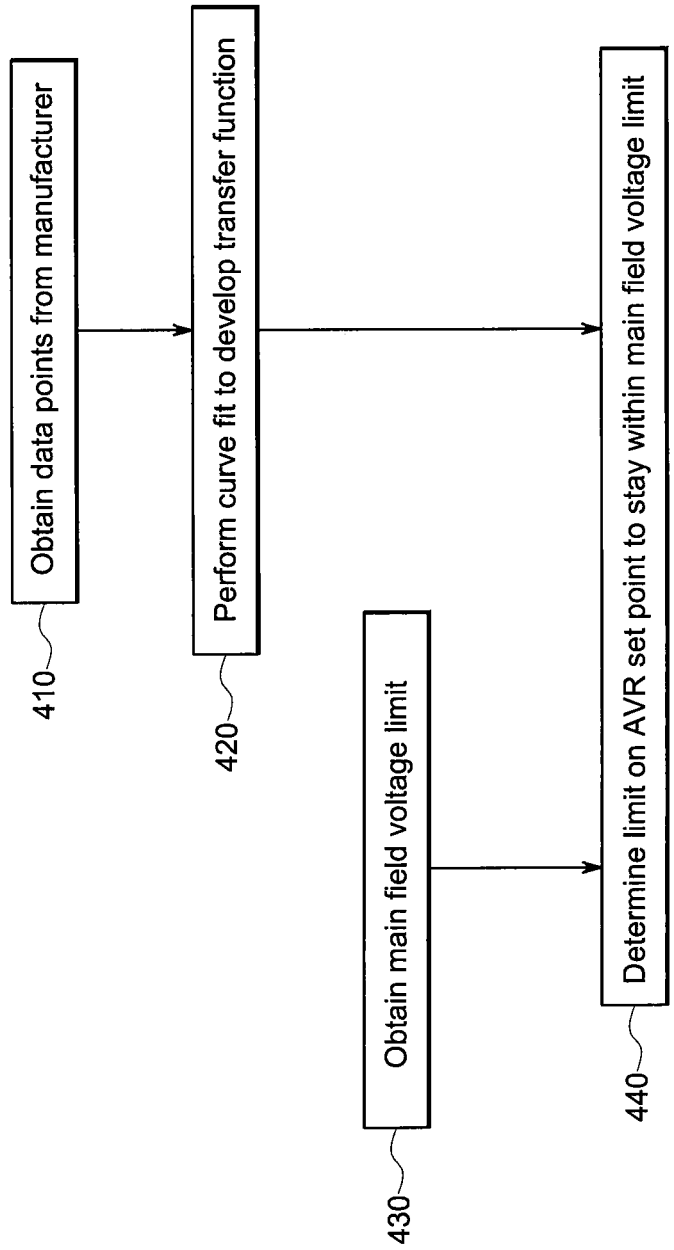
FIG. 4 is a process flow of a method of limiting main field voltage in a brushless synchronous machine according to embodiments of the invention.

FIG. 4 is a process flow of a method of limiting main field voltage 120 in a brushless synchronous machine according to embodiments of the invention. At block 410, obtaining data points from the manufacturer of the brushless synchronous machine facilitates performing a curve fit, at block 420, to develop the transfer function 210 relating the field current 110 to main field voltage 120. At block 430, the process includes obtaining a main field voltage 120 limit. This limit may be based on the manufacturer recommendation or a user (customer of the brushless synchronous machine) or a region or use of the brushless synchronous machine. Based on the main field voltage 120 limit and the corresponding field current 110 (in accordance with the transfer function 210), the limiter 310 can limit the AVR set point 320 to ensure that the field current 110 does not exceed the value at which the resulting main field voltage 120 will exceed the limit.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A brushless synchronous machine with a limiter for a main field voltage, the brushless synchronous machine comprising:
    a regulator configured to use a field current to excite main field windings and generate the main field voltage; and
    a limiter configured to limit the field current to maintain the main field voltage corresponding to the field current below a limit based at least in part on an estimation of the main field voltage based at least in part on an applied field current.

2. The brushless synchronous machine of claim 1, wherein the limiter limits an automatic voltage regulator (AVR) set point used to determine the field current.

3. The brushless synchronous machine of claim 1, wherein the limit is based on a manufacturer specification.

4. The brushless synchronous machine of claim 1, wherein the limit is based on a user specification.

5. The brushless synchronous machine of claim 1, wherein the limit is based on a region of use of the brushless synchronous machine.

6. The brushless synchronous machine of claim 1, wherein the estimation is based on using a curve fitting technique on data points provided by a manufacturer of the brushless synchronous machine.

7. The brushless synchronous machine of claim 2, wherein the AVR set point is determined based on feedback of a terminal voltage of the brushless synchronous machine which results from the main field voltage and is compared with a maximum AVR set point corresponding with the limit.

8. A method of limiting a main field voltage in a brushless synchronous machine, the method comprising:
    regulating a field current to excite main field windings and generate the main field voltage; and
    limiting the field current to maintain the main field voltage corresponding to the field current below a limit based at least in part on an estimation of the main field voltage based at least in part on an applied field current.

9. The method of claim 8, wherein the limiting includes limiting an automatic voltage regulator (AVR) set point used to determine the field current.

10. The method of claim 8, further comprising obtaining the limit based on specifications from a manufacturer of the brushless synchronous machine.

11. The method of claim 8, comprising obtaining the limit based on a user specification.

12. The method of claim 8, comprising obtaining the limit based on a region of use of the brushless synchronous machine.

13. The method of claim 8, wherein the estimation includes a curve fitting technique on data points provided by a manufacturer of the brushless synchronous machine.

14. The method of claim 9, comprising obtaining the AVR set point, determined based on feedback of a terminal voltage of the brushless synchronous machine which results from the main field voltage, to compare the AVR set point with a maximum AVR set point corresponding with the limit.

* * * * *